(12) United States Patent
McDade, Sr. et al.

(10) Patent No.: US 8,749,486 B2
(45) Date of Patent: Jun. 10, 2014

(54) CONTROL SURFACE FOR TOUCH AND MULTI-TOUCH CONTROL OF A CURSOR USING A MICRO ELECTRO MECHANICAL SYSTEM (MEMS) SENSOR

(75) Inventors: Darryn D. McDade, Sr., Livermore, CA (US); Hamid Mohammadi, Los Altos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 422 days.

(21) Appl. No.: 13/037,775

(22) Filed: Mar. 1, 2011

(65) Prior Publication Data

US 2012/0154273 A1 Jun. 21, 2012

Related U.S. Application Data

(60) Provisional application No. 61/425,457, filed on Dec. 21, 2010.

(51) Int. Cl.
*G06F 3/033* (2013.01)

(52) U.S. Cl.
USPC ......................................................... 345/157

(58) Field of Classification Search
USPC ............ 345/156–178, 184; 178/18.01–18.11; 310/12.03–12.05
See application file for complete search history.

(56) References Cited

U.S. PATENT DOCUMENTS

| | | | |
|---|---|---|---|
| 5,305,017 A | 4/1994 | Gerpheide | |
| 7,183,948 B2 * | 2/2007 | Roberts | 341/34 |
| 7,190,350 B2 * | 3/2007 | Roberts | 345/173 |
| 7,196,694 B2 * | 3/2007 | Roberts | 345/173 |
| 7,532,202 B2 * | 5/2009 | Roberts | 345/173 |
| 7,817,134 B2 * | 10/2010 | Huang et al. | 345/158 |
| 8,136,402 B2 * | 3/2012 | Cato | 73/548 |
| 8,186,221 B2 * | 5/2012 | Lin et al. | 73/514.32 |
| 8,253,698 B2 * | 8/2012 | Chen et al. | 345/173 |
| 2004/0100448 A1 * | 5/2004 | Moshrefzadeh | 345/173 |
| 2005/0167251 A1 * | 8/2005 | Sugimura et al. | 200/5 R |
| 2006/0181517 A1 * | 8/2006 | Zadesky et al. | 345/173 |
| 2008/0149832 A1 * | 6/2008 | Zorn | 250/311 |
| 2008/0150902 A1 * | 6/2008 | Edpalm et al. | 345/173 |
| 2008/0300055 A1 * | 12/2008 | Lutnick et al. | 463/39 |
| 2009/0002328 A1 * | 1/2009 | Ullrich et al. | 345/173 |
| 2009/0058819 A1 * | 3/2009 | Gioscia et al. | 345/173 |
| 2009/0128501 A1 * | 5/2009 | Lazaridis et al. | 345/173 |
| 2010/0060604 A1 * | 3/2010 | Zwart et al. | 345/173 |
| 2010/0242603 A1 * | 9/2010 | Miller et al. | 73/514.32 |
| 2010/0265201 A1 * | 10/2010 | Oh | 345/173 |
| 2013/0104669 A1 * | 5/2013 | Umetsu et al. | 73/862.041 |

FOREIGN PATENT DOCUMENTS

JP           2008198205 A  *  8/2008

* cited by examiner

*Primary Examiner* — Rodney Amadiz
(74) *Attorney, Agent, or Firm* — Leveque IP Law, P.C.

(57) ABSTRACT

A method and apparatus for touch detection, multi-touch detection and cursor control in which the acceleration of a control surface is sensed to provide sensed signals. The control surface is supported at one or more support positions and moves in response to a force applied by a user at a touch position. The sensed signals are received in a processing unit where they are used to estimate a change in the position of force application. A touch control signal is generated from the estimated change in touch position. The touch control signal may be output to a graphical user interface, where it may be used, for example, to control various elements such as mouse clicks, scroll controls, control of single or multiple cursors, or manipulation of views of an object on a visual display unit, or remote control manipulation of objects themselves.

24 Claims, 7 Drawing Sheets

CONTROL SURFACE FOR TOUCH AND MULTI-TOUCH CONTROL OF A CURSOR USING A MICRO ELECTRO MECHANICAL SYSTEM (MEMS) SENSOR

CROSS REFERENCE TO RELATED APPLICATIONS

This application claims priority to provisional application Ser. No. 61/425,457, titled "Using MEMS for touch and multi-touch control surfaces", filed Dec. 21, 2010.

BACKGROUND

A touchpad is a pointing device that may be used, like a computer mouse, to provide an interface to an electronic device. A touchpad is a specialized control surface that converts the motion and/or position of a user's fingers to a relative position on a screen of the electronic device. A touchpad is a common feature of laptop computers and also used as a substitute for a computer mouse where desk space is scarce. Touchpads can also be found on a variety of portable electronic devices such as personal digital assistants (PDAs), portable media players and mobile telephones.

Typically, touchpads used conductive or capacitive sensing to detect the motion or position of a user's finger. A matrix of sensing elements is required.

An example touchpad is disclosed in U.S. Pat. No. 5,305, 017. In this approach, a series of conductors are arranged in an array of parallel lines in two layers, separated by an insulator and crossing each other at right angles to form a grid. A high frequency signal is applied sequentially between pairs in this two-dimensional grid array. The current that passes between the nodes is proportional to the capacitance. When a virtual ground, such as a finger, is placed over one of the intersections of the conductive layer, some of the electrical field is shunted to this ground point, resulting in a change in the apparent capacitance at that location that is sensed.

Micro Electro Mechanical Systems (MEMS's) exploit the mechanical properties of silicon and the techniques of micro-machining to provided integrated mechanical structures sensitive to vibration, displacement, acceleration and rotation. MEMS technology has yielded a new generation of compact, cost effective and sensitive sensors. While conventional microelectronics development focuses on incremental improvements of a well-established technology, MEMS-based sensors challenge the way designers work, compelling them to think three dimensionally and to acquire a unique blend of multi-disciplinary skills combining electrical, semi-conductor, and mechanical design.

The new generation of sensors, based on MEMS technology, can be classified belong four families: motion sensors, pressure sensors, RF devices and micro-fluidic devices.

MEMS-based motion sensors, such as linear accelerometers and gyroscopes, are devices that are able to sense linear acceleration or rotation rate.

A variety of MEMS-based sensors, including linear accelerometer sensors, are available commercially from companies such as STMicroelectronics.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
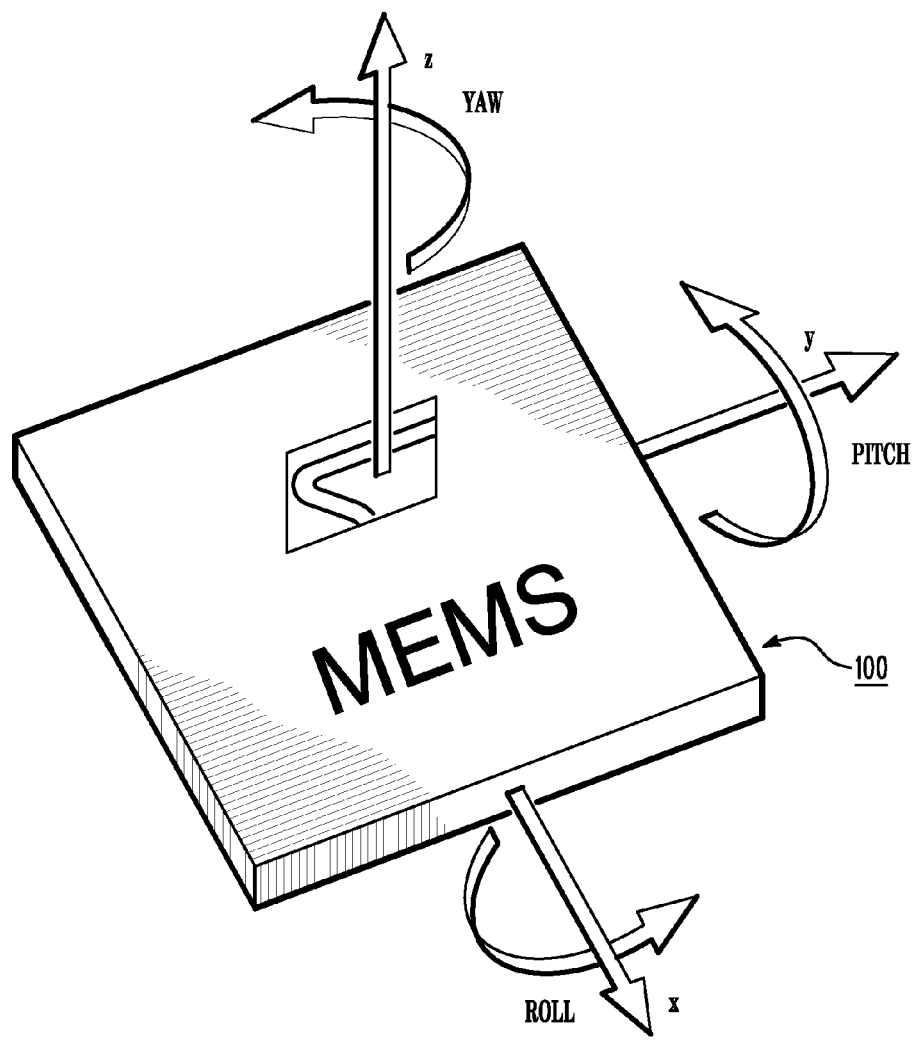
FIG. 1 shows a generic MEMS-based sensor.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to touch and multi-touch sensing interfaces for electronic devices. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may comprise MEMS devices, mechanical structures and one or more conventional processors and unique stored program instructions that control the one or more processors to implement, in conjunction with certain non-processor circuits, some, most, or all of the functions of touch and multi-touch sensing described herein. Other non-processor circuits may include, but are not limited to signal drivers, clock circuits, power source circuits, and user input devices. As such, these functions may be interpreted as a method to perform touch and multi-touch sensing interfaces for electronic devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs, ICs and mechanical structures with minimal experimentation.

For illustration purposes, FIG. 1 shows a generic MEMS-based sensor, 100. The sensor 100 is capable of detecting linear acceleration in the x, y, and z axes, and is also capable of detecting angular acceleration of pitch, yaw and roll. The sensor can be one MEMS-based sensor or individual MEMS-based sensors each having the ability to sense one or more combinations of angular and linear acceleration.

Figure 2:
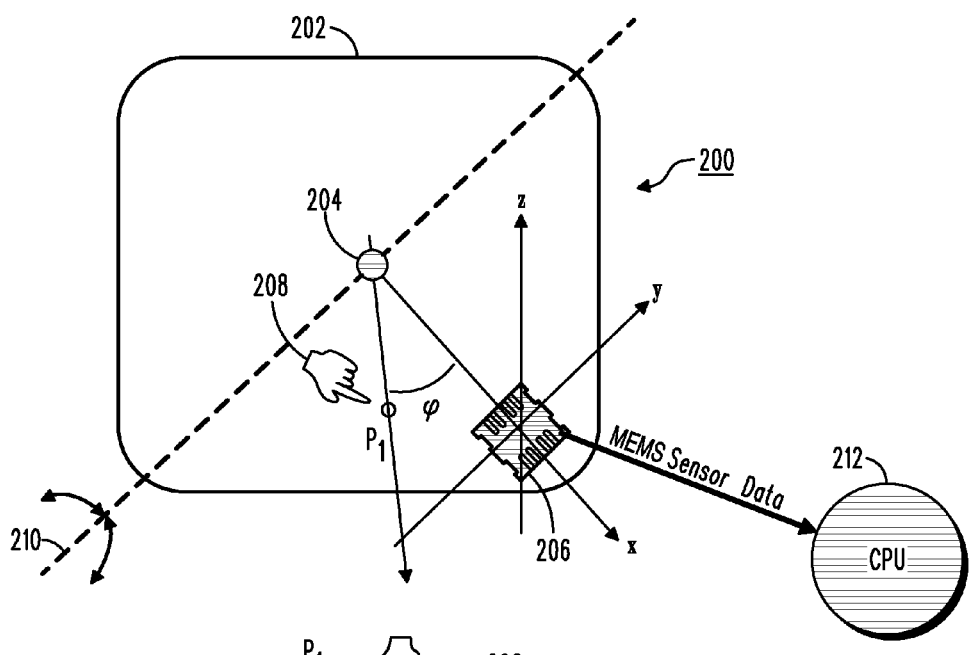
FIG. 2 is a diagrammatic view of an apparatus for touch detection and cursor tracking using a MEMS-based sensor, in accordance with some embodiments of the invention.

FIG. 2 is a top view of an apparatus for touch detection and cursor tracking using a MEMS-based sensor, in accordance with some embodiments of the invention. The apparatus 200 includes a control surface 202, a central pivot point 204, and a MEMS-based sensor 206 coupled to the control surface. In this exemplary embodiment, the MEMS-based sensor 206 is oriented with the x-axis directed away from the pivot point 204. The control surface may be semi-flexible. The z-axis is oriented perpendicular to the control surface and the y-axis lies parallel to the control surface, perpendicular to the x-axis and the z-axis. Other orientations may be used. In this orientation, the sensor is at the sensing position $[r,0,0]^T$ when the control surface is not deflected, where r is the distance from the pivot point 204.

In operation, a user's finger 208 presses on the control surface 202 at a touch position denoted as $P_1$, causing the control surface to pivot and/or flex about line 210 that passes through the pivot point 204. The control surface at the touch position $P_1$, where the finger presses on the control surface 202, is deflected through an angle θ. The touch position $P_1$ is at angle φ from the sensor position in the plane of the control surface 202. The deflection is sensed by the MEMS-based sensor 206 and the sensed signal is passed to a processing unit 212. The processing unit 212 processes the sensed signals and computes a touch control signal that may be passed to a remote apparatus. For example, the touch control signal may be used to control an on-screen cursor of a graphical user interface, or it may be used to provide multiple control signals to a remotely controlled object.

Figure 3:
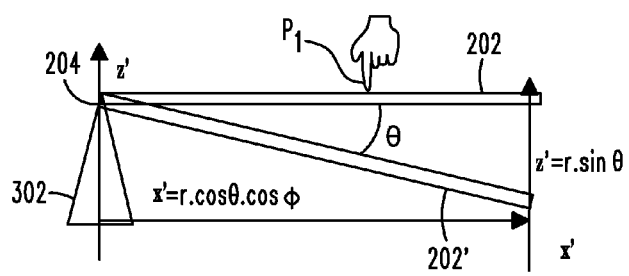
FIG. 3 is a side view of the apparatus shown in FIG. 2.

FIG. 3 is a side view of the apparatus 200. FIG. 3 shows the un-deflected control surface 202 and the deflected control surface 202'. The control surface is supported by a pivot or fulcrum 302 and is rotated about the pivot point 204 by an angle θ. The position of point $P_1$ moves from a point with Cartesian coordinates $$\begin{bmatrix} f \cdot \cos\phi \\ -f \cdot \sin\phi \\ 0 \end{bmatrix} \quad (1)$$

to the position $$\begin{bmatrix} f \cdot \cos\theta\cos\phi \\ -f \cdot \cos\theta\sin\phi \\ f \cdot \sin\theta \end{bmatrix} \quad (2)$$

where f is the distance from the pivot point 204.

If the control surface does not bend in the region between the touch position $P_1$ and the sensor position, the sensor moves from the position $$s = \begin{bmatrix} r \\ 0 \\ 0 \end{bmatrix} \quad (3)$$

to the position $$s_1 = \begin{bmatrix} r \\ 0 \\ 0 \end{bmatrix} + r\cos\phi \begin{bmatrix} -(1-\cos\theta)\cos\phi \\ (1-\cos\theta)\sin\phi \\ \sin\theta \end{bmatrix}. \quad (4)$$

Since the angle φ is substantially constant, the acceleration vector is $$a \equiv \begin{bmatrix} a_1 \\ a_2 \\ a_3 \end{bmatrix} = \frac{\partial^2 s_1}{\partial t^2} = r\cos\phi \begin{bmatrix} \frac{\partial^2 \cos\theta}{\partial t^2}\cos\phi \\ -\frac{\partial^2 \cos\theta}{\partial t^2}\sin\phi \\ \frac{\partial^2 \sin\theta}{\partial t^2} \end{bmatrix}, \quad (5)$$

It can be seen that the angle φ is related to the components of the acceleration vector by $$\phi = -\tan^{-1}\left(\frac{a_2}{a_1}\right). \quad (6)$$

Thus, in operation, the finger 208 depresses the control surface 202 at angle φ relative to the sensor position, causing the control surface to deflect about pivot line 210. The control surface motion causes acceleration which is detected by the sensor 206. The angle φ, which indicates where the control surface was pressed, can be found from the acceleration of the control surface measured by the MEMS-based sensor, using equation (6), for example.

The apparatus operates as a touch pad, in that the position (at least the angle of the touch) s estimated. This is in contrast to a computer mouse, which monitors change in position, rather than the position itself.

Figure 4:
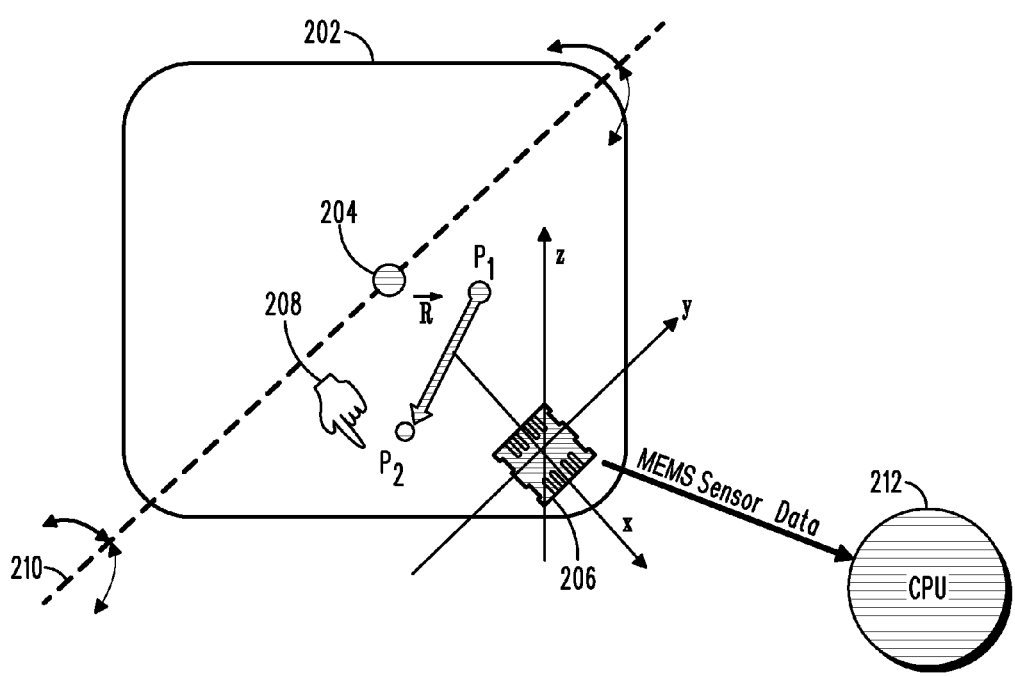
FIG. 4 is a diagrammatic view of an apparatus for multi-touch detection and cursor tracking using a MEMS sensor, in accordance with some embodiments of the invention.

FIG. 4 is a diagrammatic view of an apparatus for multi-touch detection and cursor tracking using a MEMS-based sensor, in accordance with some embodiments of the invention. If the user moves the finger to a second touch position $P_2$, as shown in FIG. 4, while keeping the control surface deflected, the resulting acceleration vector at the sensing position, measured by the MEMS sensor is $$a \equiv \begin{bmatrix} a_1 \\ a_2 \\ a_3 \end{bmatrix} = r \begin{bmatrix} -(1-\cos\theta)\frac{\partial^2}{\partial t^2}\cos^2\phi \\ (1-\cos\theta)\frac{\partial^2}{\partial t^2}(\sin\phi\cos\phi) \\ \sin\theta\frac{\partial^2}{\partial t^2}\cos\phi \end{bmatrix}, \quad (7)$$

where it is assumed that the angle θ remains substantially constant.

The acceleration vector may be doubly integrated from time $t_1$ to time $t_2$ in the processing unit to give an estimate of the sensor position as $$s(t_2) = s(t_1) + \int_{t_1}^{t_2}\int_{t_1}^{t_2} a(t)dt = s(t_1) + r\cos\phi \begin{bmatrix} -(1-\cos\theta)\cos\phi \\ (1-\cos\theta)\sin\phi \\ \sin\theta \end{bmatrix}, \quad (8)$$

so the angle ϕ can be found as $$\phi = -\tan^{-1}\left(\frac{s_2(t_2)-s_2(t_1)}{s_1(t_2)-s_1(t_1)}\right). \quad (9)$$

Once the angles θ and ϕ have been estimated, the new touch position $P_2$ is estimated using equation (2), for example.

In one embodiment, the sensor signals are sampled and the double time integration in equation (8) is performed digitally in the processing unit.

Once the two touch positions $P_1$ and $P_2$ have been estimated, the software in the processing unit 206 can construct a vector $\vec{R}$ between these points which is used to track finger motion, as is done with a computer mouse.

It is noted that for controlling a cursor on a screen there only needs to be a relationship between relative motions of the finger and the cursor.

The process is continually repeated, generating new segments and new vectors $\vec{R}_1, \vec{R}_2, \ldots \vec{R}_n$.

The resulting series of vectors $\vec{R}_1, \vec{R}_2, \ldots \vec{R}_n$ can be reported back by the processing unit 212 to an operating system the same way a traditional computer mouse reports them, and the operating system can use the vectors to control movement of a cursor on a screen.

The description above describes how single-touch detection and cursor tracking may be achieved using a single sensor on a semi-rigid pivoting control surface. In a further embodiment, the approach is extended to dual-touch detection and cursor tracking may be achieved using MEMS-based sensors. Independent, two-finger cursor action can be achieved by using a flexible control surface that bends to allow two halves of the control surface to bend, and by using two MEMS-based sensors, as shown in FIG. 5.

Figure 5:
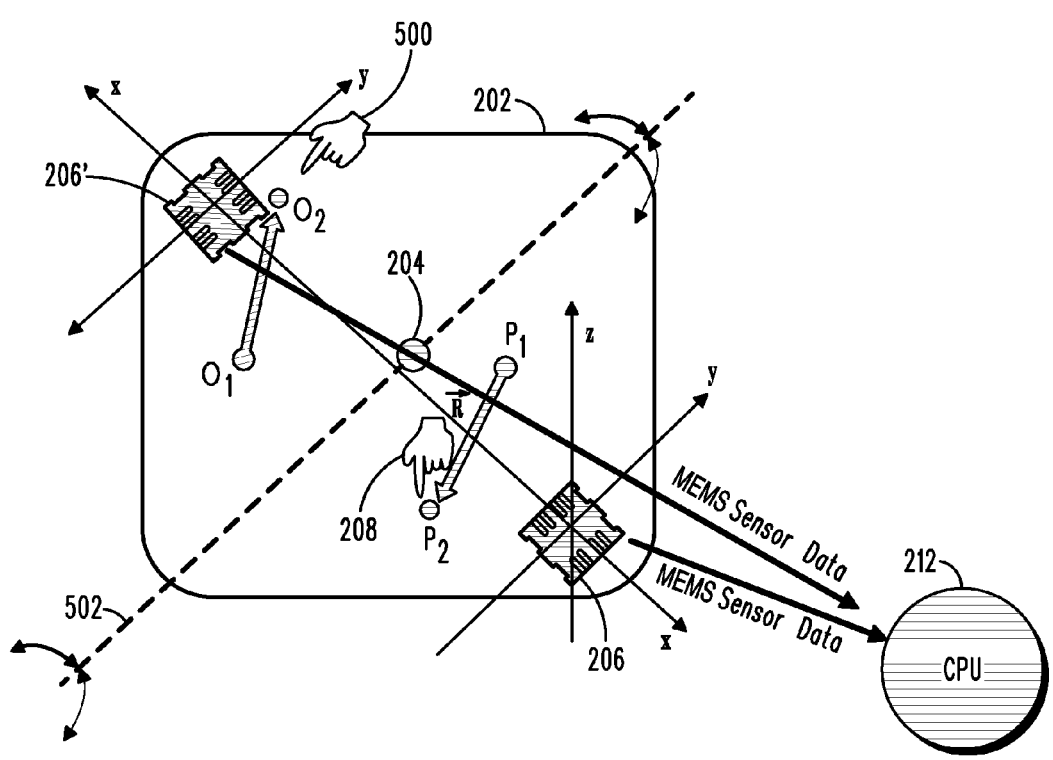
FIG. 5 is a view of a touch control surface using MEMS-based sensors, in accordance with some embodiments of the invention.

FIG. 5 is a view of a touch control surface using MEMS-based sensors, in accordance with some embodiments of the invention. The control surface is flexible but does not expand so there will be no interference between the two operations. For example, when the control surface 202 is pressed by two fingers 208 and 500 at different points, shown as $P_1$ and $O_1$, respectively, in FIG. 5, the control surface is deflected with a tendency to fold along a line 502 passing through the pivot point 204 and between the points as $P_1$ and $O_1$ where the control surface is pressed. The slope of the control surface at the positions of the sensors 206 and 206', and the positions of the sensors themselves, are related to the positions $P_1$ and $O_1$ at which the control surface is pressed.

The regions of the control surface on either side of the line 502 may be treated are being approximately independent. Thus, the positions (at the least the circumferential positions) of each of the two touches may be found by the procedure outlined above. That is, the signals from sensors 206 and 206' are passed to processing unit 212, which uses the signals to estimate the sensor positions, or change in sensor positions, and thereby estimate the positions $P_1$ and $O_1$.

Similarly, movement of the positions, $P_1$ to $P_2$ and $O_1$ to $O_2$ can found to enable simultaneous tracking of two positions on the control surface 202.

In a further embodiment, the approach is extended to multi-touch detection and cursor tracking. The embodiment shown in FIG. 6, uses four MEMS-based sensors, 206. Signals from all four sensors are sent to the processing unit 212.

In this embodiment, the control surface is sensitive to four different regions, one associated with each sensor. This enables independent tracking of three- and four touch positions, as denoted by the vectors $\vec{R}, \vec{S}, \vec{P}, \vec{Q}$ in FIG. 6.

The processing unit 212 is configured to repeat the touch detection and cursor tracking operations for each of the regions independently.

Figure 6:
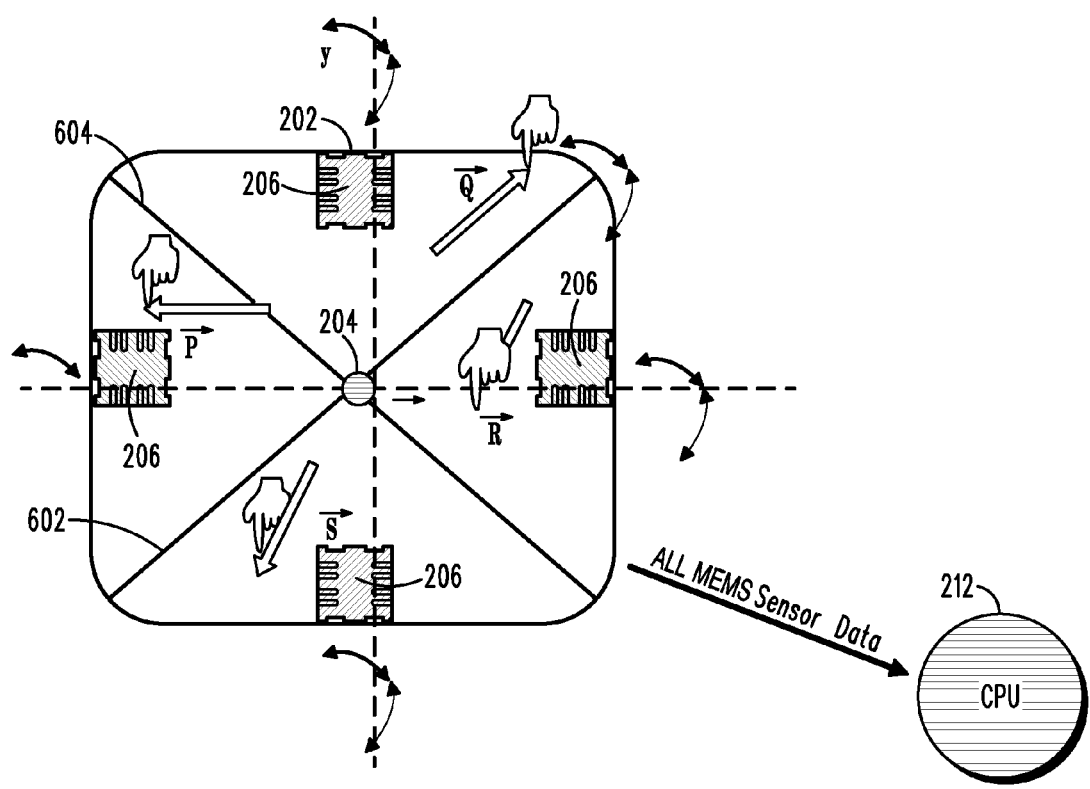
FIG. 6 is a view of a further touch control surface using MEMS-based sensors, in accordance with some embodiments of the invention.

Since the control surface is flexible but does not expand, there will be no interference between the operations as shown in FIG. 6.

The control surface is divided into four separate triangular regions, separated by the band lines 602 and 604, with a common apex at the central pivot point 204, and each quadrant can either have or not have its own pivot lines, further capability can be gained. This configuration allows three and four digit cursor tracking.

In the case of three digit tracking, a software application, executed on the processing unit 212 or on a processor linked to the processing unit 212, can allow the user's touch to create arbitrary triangles by stretching the user's digits along the control surfaces. For example, in the case of a 3D-CAD application, the operator can use three digits to orient a 3-D object or draw a triangle. Other uses will be apparent to those of ordinary skill in the art.

In the case of four digit tracking, for example, the user could stretch arbitrary rectangular shapes on an application and in 3-D CAD the fourth digit can be used to zoom in on a 3-D object.

Figure 7:
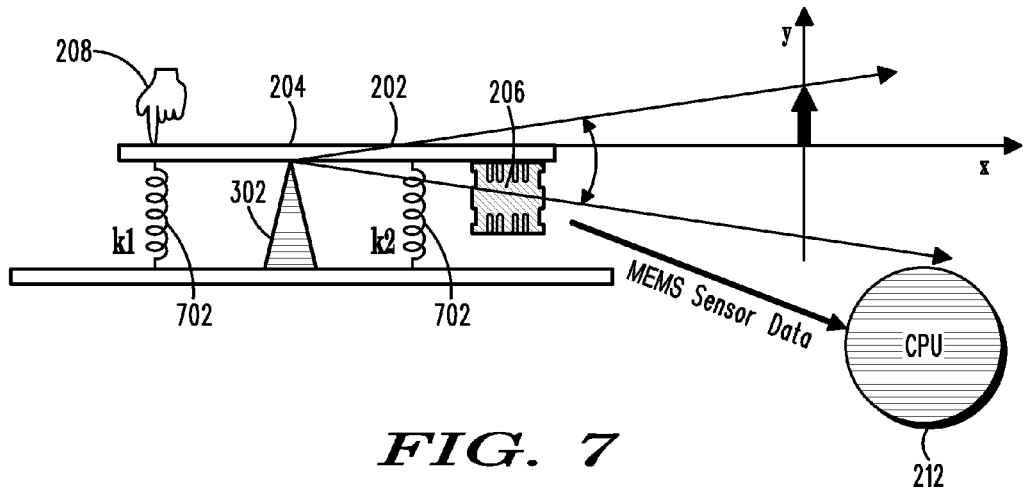
FIG. 7 shows a side view of a control surface for scroll control, in accordance with some embodiments of the invention.

In a further embodiment of the invention, shown in FIG. 7, a cursor scroll function is provided using a MEMS-based sensor on a touch control surface. FIG. 7 shows a side view of a control surface 202 supported at position 204 by a pivot or fulcrum 302. The control surface is held in equilibrium by one or more springs 702. When a finger 208 presses on the control surface, the control surface is tilted. The amount of tilt is dependent upon the moment applied by the finger 208, which, in turn, depends upon the force applied by the finger and distance of the finger from the pivot position 204. This distance is known as the lever arm.

The amount of tilt is monitored by a MEMS-based sensor 206 and processing unit 212. When the MEMS-based sensor is an accelerometer, the tilt may be estimated by doubly integrating the signal from the sensor.

Scrolling, which is equivalent to cursor tracking in a single dimension, may be accomplished in a variety of ways, depending on the choice of cursor behavior desired by an application programmer. Firstly, scrolling may be achieved by a user pressing the control surface at a single point with a varying force. Secondly, scrolling may be achieved by a user sliding a digit towards or away from the pivot point 204 with constant force. Thirdly, scrolling may be achieved by a user sliding the digit towards or away from the pivot point 204 with varying force.

For example, when a single spring is used, the deflection d of the spring is given by $$d_{spring} = \frac{kM}{r_s}, \quad (10)$$

where k is the spring constant, M is applied moment and $r_s$ is the distance of the spring from pivot point.

The moment is given by $$M = Fr_f, \quad (11)$$

where $r_f$ is the distance of the finger from the pivot point. Hence, the deflection $$d_{spring} = \frac{kFr_f}{r_s} \quad (12)$$

The deflection of the sensor is $$d_{sensor} = -\frac{kFr_r}{r_s} \cdot \frac{r_{sensor}}{r_s} = \frac{kr_{sensor}}{r_s^2} Fr_f. \quad (13)$$

The term $$\frac{kr_{sensor}}{r_s^2}$$

is constant for the system, hence the deflection is proportional to applied force F and the distance $r_f$ at the which the force is applied. Multiple springs can be modeled as single equivalent spring, so the result in equation is valid when multiple springs are used.

When the MEMS-based sensor is an accelerometer oriented perpendicular to the control surface, the deflection may be obtained by a double time integration of the sensor signal.

A sequence of deflection values may be used to generate a sequence of scroll events that is passed to the operating system. The values may be normalized.

If the user increases the pressure on the control surface or presses with increasing force, the processing unit 212 increases the scroll value, thereby emulating accelerated cursor movement.

If the user decreases the force applied to the control surface 202, the processing unit 212 decreases the scroll value sent to the operating system, thereby emulating slower cursor movement.

One more springs may be used. The value of the spring constant and the positions of the springs may be selected to control the equilibrium position of the control surface.

Figure 8:
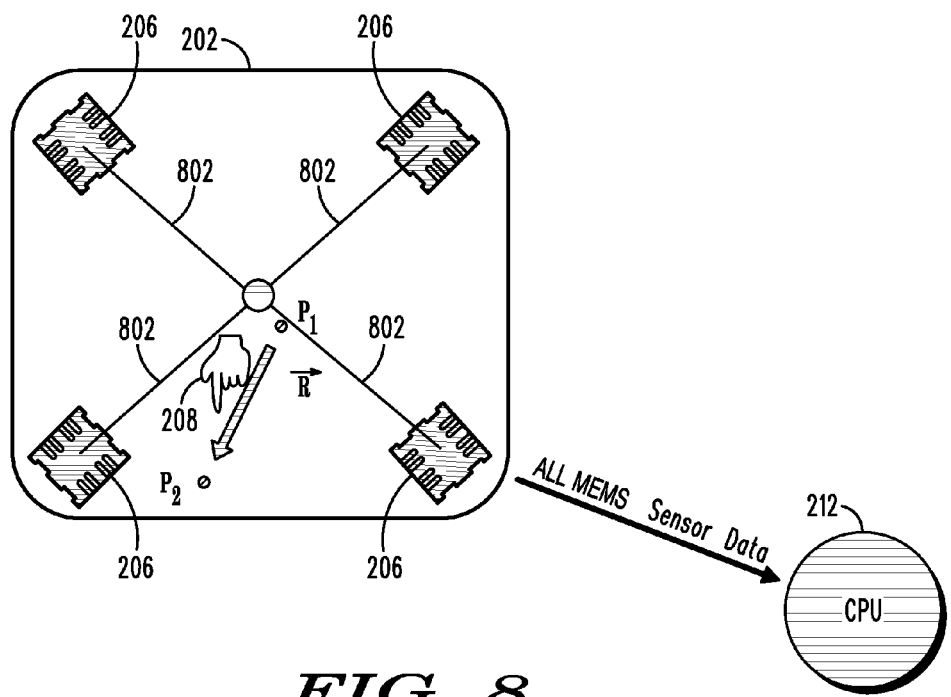
FIG. 8 shows a further embodiment of a control surface using MEMS-based sensors on a deformable control, in accordance with some embodiments of the invention.

FIG. 8 shows a further embodiment of the invention, in which MEMS-based sensors on a deformable control surface are used for touch detection and cursor tracking. Referring to FIG. 8, the apparatus comprises a flexible control surface 202 and three or more MEMS accelerometers 206.

When a force is applied to the control surface 202 by a digit 208 at a touch position $P_1$ on the control surface, the control surface deforms, in much the same way as a rubber sheet supporting a ball in a gravitational field.

This technique is equivalent to constructing the tracking direction vectors by assuming there is a mass in the center of a semi-flexible control surface in the presence of an attractive field (like a ball on a sheet in a gravity field).

When the digit depresses the control surface, the control surface deforms (bends and stretches slightly) and each of the four sensors senses the resulting acceleration. The measured acceleration vectors will point towards the touch position $P_1$.

For example, if the control surface is depressed a distance d(t) at time t at a distance r from the fixed edge of the control surface, the control surface stretches by an amount $\sqrt{r^2+d(t)^2}-r$ along the lines designated as 802 in FIG. 8. A sensor positioned a distance s from the edge is accelerated an amount $$a(t) = \frac{\partial^2}{\partial t^2}\left(\sqrt{r^2 + d(t)^2} - r\right)\frac{s}{r}$$

in the direction of the depression. The components of the acceleration, parallel to the control surface, measured by the sensor are $a_x(t)=a(t)\cos(\theta)$ and $a_y(t)=a(t)\sin(\theta)$, where the angle θ denotes the angle of the depression relative to the sensor axes. Thus, the angle θ may be computed from the acceleration components.

The processing unit 212 receives the acceleration vectors and computes the point where these vectors intersect. In addition, it may compute where they would be projected to lie on the control surface 202.

When the digit 208 is moved from position $P_1$ to a new position $P_2$, the processing unit 212 performs a double integration with respect to time of the components of the acceleration signals and computes the change in position. Thus, the movement vector $\vec{R}$, shown in FIG. 8, may be constructed.

This sequence may be repeated for additional points, and the processing unit 212 reports to the movement vectors to the operating system to enable control of a cursor, for example.

Click and double-click events may be detected by monitoring the component of acceleration perpendicular to the control surface 202 (the z-component) relative to acceleration in the plane of the control surface (the x- and y-components) or, equivalently, by monitoring the perpendicular components of acceleration relative to changes in the angle θ. The component of acceleration perpendicular to the control surface is $$a_z(t) = \frac{s}{r}\frac{\partial^2 d(t)}{\partial t^2}.$$

When a perpendicular acceleration is detected and little or no x- or y-acceleration (or, equivalently, little or no θ acceleration) is detected in a small time frame, the processing unit 212 interprets this as an impulse or click.

When the processing unit detects two clicks within a small frame it interprets this as a double click. The time frame may be user defined.

This technique can be used on one or more of the sensors to enable useful application controls. An example is a CAD program, where an operator may use a mouse click to "lock down" an axis and rotate a three dimensional object about this axis for viewing or editing.

The monitoring sequence is continuously repeated over sequential time frames and the processing unit reports the tracking movements, clicks, double clicks or lack of activity to the operating system.

Figure 9:
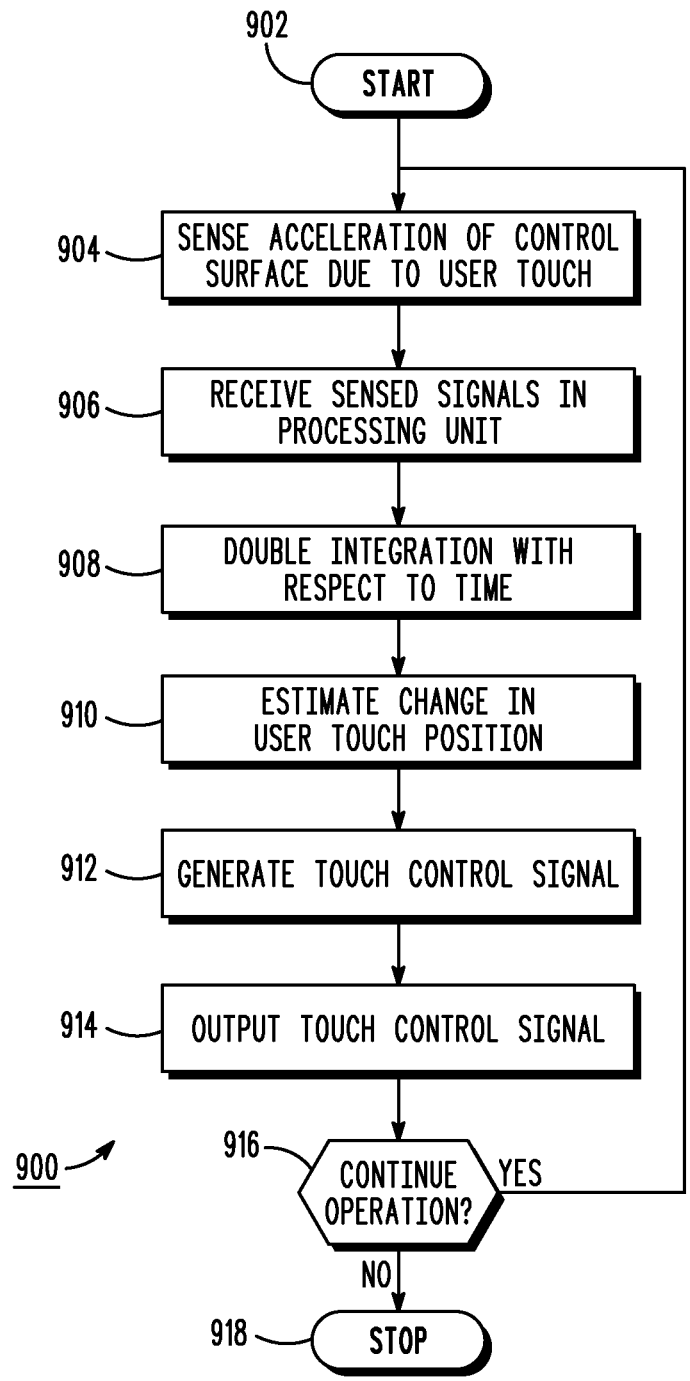
FIG. 9 is a flow chart of a method for touch control of a graphical user interface in accordance with some embodiments of the invention.

FIG. 9 is a flow chart 900 of a method for touch control of a graphical user interface, in accordance with some embodiments of the invention. Following start block 902 in FIG. 9, the acceleration of a control surface is sensed at block 904 to provide a sensed signal. The control surface is supported at one or more support positions and adapted to move in response to a force applied by a user at a first position on the control surface. The sensed signals are received in a processing unit at block 906, where they are doubly integrated with respect to time at block 908. This allows the processing unit to estimate a change in the first touch position on the control surface at block 910. At block 912, a touch control signal is generated by the processing unit from the estimated change in the first touch position. Finally at block 914, the touch control signal is output to a graphical user interface, where it may used to control various elements such as mouse clicks, scroll controls, control of single or multiple cursors, or manipulation of views of two or three dimensional elements on a visual display unit.

If operation is completed, as indicated by the negative branch from decision 916, the operation terminates at block 918. Otherwise, as depicted by the positive branch from decision block 916, flow returns to block 904.

As described above, in one embodiment the one or more support positions may comprise a pivot point at which the control surface contacts a fulcrum, and sensing the acceleration vector of the control surface may comprises sensing an acceleration vector at one or more sensing positions on the control surface using one or more MEMS-based accelerometers.

Also, as described above, the touch control signal comprises at plurality of cursor control signals for controlling objects on a visual display screen.

The control surface is support by a spring such that the change in the first position is related to the force applied at the first position and/or the distance between the first position and the pivot point. The touch control signal comprises a signal for controlling a scroll function.

In a further embodiment, the one or more support positions are located at the periphery of the control surface and the control surface is flexible that both bends and stretches in response to the applied force. In this embodiment, acceleration vectors are sensed at multiple sensing positions on the control surface using multiple MEMS-based accelerometers.

Acceleration of the control surface perpendicular to the control surface may be sensed over successive time intervals to provide a mouse click signal or a mouse double-click signal.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An apparatus for providing touch control information, the apparatus comprising:
a control surface supported at one or more support positions and adapted to move in response to pressure applied at a location on the control surface;
a first sensor, coupled to the control surface at a first sensing position, distinct from the one or more support positions, and operable to produce a first sensed signal in response to motion of the control surface at the first sensing position, the first sensed signal indicative of a change in a rotation angle of the control surface as the location of the applied pressure moves from a first touch position on the control surface to a second touch position on the control surface over a time interval; and
a processing unit operable to receive the first sensed signal and to compute a change in the location of the applied pressure over the time interval from the first sensed signal,
wherein the touch control information is derived from the change in the location of the applied pressure.

2. An apparatus in accordance with claim 1, wherein the first sensor comprises an accelerometer and wherein the processing unit is operable to compute the change in the location of the applied pressure dependent upon a double time integration of the first sensed signal.

3. An apparatus in accordance with claim 2, wherein the first sensor is operable to sense motion in a plurality of directions.

4. The apparatus of claim 3, where the location of the applied pressure changes by an angle φ in the plane of the control surface and where the processor is operable to compute the angle φ as $$\phi = -\tan^{-1}\left(\frac{a_2}{a_1}\right),$$

where $a_1$ and $a_2$ are components of the sensed motion in the plane of the control surface.

5. An apparatus in accordance with claim 1, wherein the processing unit is operable to compute at least one position coordinate of the first touch position dependent upon the first sensed signal, and wherein the touch control information is derived from the at least one position coordinate of the first touch position.

6. An apparatus in accordance with claim 1, wherein the control surface comprises a flexible control surface supported at its periphery, the apparatus further comprising:
second, third and fourth sensors coupled to the control surface and operable to produce sensed signal in response to motion of the control surface due to pressure applied at the first touch position on the control surface, wherein the processing unit is operable to receive sensed signals from the first, second, third and fourth sensors and to compute the change in the location of the applied pressure over the time interval from changes in the sensed signals from the first, second, third and fourth sensors.

7. An apparatus for providing touch control information, the apparatus comprising:
- a control surface supported at one or more support positions and adapted to move in response to pressure applied at a location on the control surface;
- a first sensor, coupled to the control surface at a first sensing position and operable to produce a first sensed signal in response to motion of the control surface at the first sensing position, the first sensed signal indicative of a change in a rotation angle of the control surface as the location of the applied pressure moves from a first touch position on the control surface to a second touch position on the control surface over a time interval; and
- a processing unit operable to receive the first sensed signal and to compute a change in the location of the applied pressure over the time interval from the first sensed signal, wherein the touch control information is derived from the change in the location of the applied pressure, the apparatus further comprising a fulcrum, wherein the control surface is supported at a pivot point by the fulcrum and is adapted to pivot about the pivot point when pressure is applied at the first position on the control surface, and wherein the fulcrum is not located at the first sensing position.

8. An apparatus in accordance with claim 7, wherein the control surface is flexible and bends about a line though the pivot point when pressure is applied at first and second touch positions on the control surface, the apparatus further comprising:
- a second sensor, coupled to the control surface at a second sensing position and operable to produce a second sensed signal in response to motion of the control surface at the second sensing position, wherein the processing unit is operable to receive the second sensed signal and to compute a change in the second touch position over the time interval from changes in the second sensed signal over the time interval, and wherein the touch control information is derived from the change in the first touch position and the change in the second touch position.

9. An apparatus in accordance with claim 7, wherein the control surface is flexible and bends about a plurality of lines though the pivot point when pressure is applied at a plurality of touch positions on the control surface, the apparatus further comprising:
- a plurality of sensors, coupled to the control surface and operable to produce a plurality of second sensed signal in response to motion of the control surface, wherein the processing unit is operable to receive the plurality of sensed signals and to compute changes in the plurality of touch positions over the time interval from changes in the plurality of sensed signal over the time interval, and wherein the touch control information is derived from the changes in the plurality of touch positions and comprises control information for a plurality of cursors.

10. An apparatus in accordance with claim 7, wherein the control surface is substantially rigid, the apparatus further comprising:
- a spring element acting on the control surface at one or more positions and configured to bias the control surface to an equilibrium position, such that motion of the control surface is dependent upon the force applied to the control surface at the first touch position and upon the distance from the first touch position from the pivot point, wherein the touch control information comprises information for control of a scrolling function.

11. An apparatus in accordance with claim 7, wherein the touch control information comprises one or more signals selected from the group of signals consisting of:
- a cursor control signal;
- a scroll control signal;
- a mouse 'click' signal; and
- a mouse 'double-click' signal.

12. A method for touch control of a remote apparatus, the method comprising:
- sensing acceleration of a control surface supported at one or more support positions and adapted to move in response to a force applied by a user at a location on the control surface to provide one or more sensed signals, the one or more sensed signals indicative of a changing angle of the control surface as the location of the applied force moves from a first touch position on the control surface to a second touch position on the control surface over a time interval;
- receiving the one or more sensed signals in a processing unit;
- doubly integrating the one or more sensed signals in the processing unit to estimate a change in the location of the applied force on the control surface;
- generating a touch control signal from the estimated change in the location of the applied force; and
- outputting the touch control signal to a graphical user interface.

13. A method in accordance with claim 12, wherein the one or more support positions are located at the periphery of the control surface and wherein the control surface is flexible.

14. A method in accordance with claim 13, wherein sensing acceleration of the control surface comprises sensing motion of the control surface perpendicular to the control surface over successive time intervals, and wherein the touch control signal comprises a mouse click signal.

15. A method in accordance with claim 13, wherein sensing acceleration of the control surface comprises sensing motion of the control surface perpendicular to the control surface over successive time intervals, and wherein the touch control signal comprises a mouse double-click signal.

16. A method in accordance with claim 13, wherein sensing acceleration of the control surface comprises sensing acceleration vectors at a plurality of sensing positions on the control surface using a plurality of MEMS-based accelerometers.

17. A method in accordance with claim 12, wherein the touch control signal comprises a plurality of cursor control signals for controlling a view of an object on a visual display screen.

18. A method in accordance with claim 12, wherein the remote apparatus comprises a graphical user interface.

19. A method in accordance with claim 12, wherein the touch control signal comprises a plurality of manipulation controls for controlling the remote apparatus.

20. A method for touch control of a remote apparatus, the method comprising:
- sensing acceleration of a control surface supported at one or more support positions and adapted to move in response to a force applied by a user at a location on the control surface to provide one or more sensed signals, the one or more sensed signals characteristic of a changing angle of the control surface as the location of the applied force moves from a first touch position on the control surface to a second touch position on the control surface over a time interval;
- receiving the one or more sensed signals in a processing unit;

doubly integrating the one or more sensed signals in the processing unit to estimate a change in the location of the force applied on the control surface;

generating a touch control signal from the estimated change in location of the applied force; and outputting the touch control signal to the graphical user interface, wherein the one or more support positions comprise a pivot point at which the control surface contacts a fulcrum.

21. A method in accordance with claim 20, wherein sensing the acceleration of the control surface comprises sensing an acceleration vector at one or more sensing positions on the control surface using one or more MEMS-based accelerometers.

22. A method in accordance with claim 20, wherein the control surface is supported by a spring such that the change in the location of the applied force is related to the force applied at the first touch position, and wherein the touch control signal comprises a signal for controlling a scroll function.

23. A method in accordance with claim 20, wherein the control surface is supported by a spring such that the change in the location of the applied force is related to the distance between the first touch position and the pivot point, and wherein the touch control signal comprises a signal for controlling a scroll function.

24. An apparatus for providing touch control information, the apparatus comprising:

a fulcrum;

a control surface supported at a pivot point on the fulcrum and adapted to move in response to pressure applied at a first touch position on the control surface;

a first sensor, coupled to the control surface at a first sensing position and operable to produce a first sensed signal characteristic of motion of the control surface at the first sensing position due to rotation of the control surface about the pivot point; and a processing unit operable to receive the first sensed signal and to compute an estimate of the first touch position dependent upon the first sensed signal, wherein the touch control information is derived from the estimate of the first touch position.

\* \* \* \* \*